United States Patent [19]

Schmidt

[11] 4,089,566
[45] May 16, 1978

[54] BEARING WITH MULTIPLICITY OF SLIDING HEADS

[75] Inventor: Wolfgang Schmidt, Schweinfurt, Germany

[73] Assignee: Kugelfischer Georg Schäfer & Co., Schweinfurt, Germany

[21] Appl. No.: 775,755

[22] Filed: Mar. 9, 1977

[30] Foreign Application Priority Data

Mar. 10, 1976  Germany ............................. 2609935

[51] Int. Cl.² ...................... F16C 27/02; F16C 33/74
[52] U.S. Cl. .................................... 308/3 R; 308/26; 308/72; 308/73; 308/238
[58] Field of Search ................. 308/3 R, 72, 238, 73, 308/4 R, 26, 28, 160, 237 R, 237 A, 239, DIG. 3, DIG. 11, 161, 162, 135, 140, 157; 267/152, 141

[56] References Cited

U.S. PATENT DOCUMENTS

| | | | |
|---|---|---|---|
| 3,461,529 | 8/1969 | Van Dorn | 308/72 X |
| 3,602,560 | 8/1971 | Memmel | 308/72 X |
| 3,819,241 | 6/1974 | Memmel | 308/3 R |
| 4,025,129 | 5/1977 | Markfelder et al. | 308/72 X |

Primary Examiner—Trygve M. Blix
Assistant Examiner—Douglas C. Butler
Attorney, Agent, or Firm—Karl F. Ross

[57] ABSTRACT

A pair of relatively rotatable support members, separated by a gap centered on the axis of rotation, engage each other through a multiplicity of elastically deformable sliding heads of low-friction plastic material projecting from one support member into the gap and resting against a confronting contact surface of the other support member. Each sliding head is tightly embraced by a rigid retaining sleeve which is positively guided on the first support member for movement perpendicular to the contact surface and is urged by one or more biasing springs toward that surface so as to surround the entire projecting portion of the sliding head under all loading conditions.

10 Claims, 9 Drawing Figures

BEARING WITH MULTIPLICITY OF SLIDING HEADS

FIELD OF THE INVENTION

My present invention relates to a bearing with two relatively rotatable support members, one of which may be rigid with a shaft while the other may be fastened to a machine housing or frame, that are in sliding contact with each other.

BACKGROUND OF THE INVENTION

Large-size journal or thrust bearings of this type are frequently made with a multiplicity of spacing units including sliding heads of elastically deformable low-friction material, preferably a synthetic resin such as nylon or Teflon, which are carried on one support member and extend across an intervening gap, centered on the axis of rotation, to a confronting contact surface of the other support member. In a journal bearing, the support members may be a pair of coaxial bearing rings; the outer support, however, might also be a larger structure, such as a wall or a base on which the shaft is rotatably mounted.

While the elasticity of the sliding heads facilitates their adaptation to the shape of the contact surface, the stresses due to the load and to the relative rotation tend to broaden the faces of these heads and also to extrude some of their material laterally into the gap. A partial solution to this problem resides in the provision of retaining sleeves surrounding the sliding heads, e.g. as described in U.S. Pat. No. 3,819,241 according to which the heads project radially beyond their retaining sleeves to an extent which corresponds to the elastic compressibility of the heads under load. Thus, upon loading, the sliding heads become flush with their retaining sleeves so that part of the load is borne by these rigid sleeves which thereby determine the minimum separation of the bearing rings anywhere along the gap. When under less than maximum load, the sliding heads rise above their sleeves so that portions thereof are unprotected and tend to creep sideways, especially when subjected to compressive forces in a direction other than perpendicular to the bearing axis. The exposed portions of the sliding heads are also liable to contamination by abraded particles and by atmospheric agents.

OBJECT OF THE INVENTION

The object of my present invention, therefore, is to provide a slide bearing of this general character in which the aforestated drawbacks are avoided.

SUMMARY OF THE INVENTION

In accordance with this invention, the retaining sleeves are biased toward the confronting contact surface by spring means continuously urging these sleeves against that surface so as to keep the heads substantially fully surrounded under all load conditions. At least after an initial run under load, the sliding heads — having been slightly broadened by the pressure — will be frictionally gripped by their retaining sleeves with sufficient force to remain more or less flush therewith even in the unloaded state. The sleeves may have portions offset from the spring means designed to abut, under a maximum loading force, against the support member carrying the sliding heads in order to maintain a minimum gap width between the two members.

BRIEF DESCRIPTION OF THE DRAWING

The above and other features of my invention will now be described in detail with reference to the accompanying drawing in which.

SPECIFIC DESCRIPTION

Figure 1:
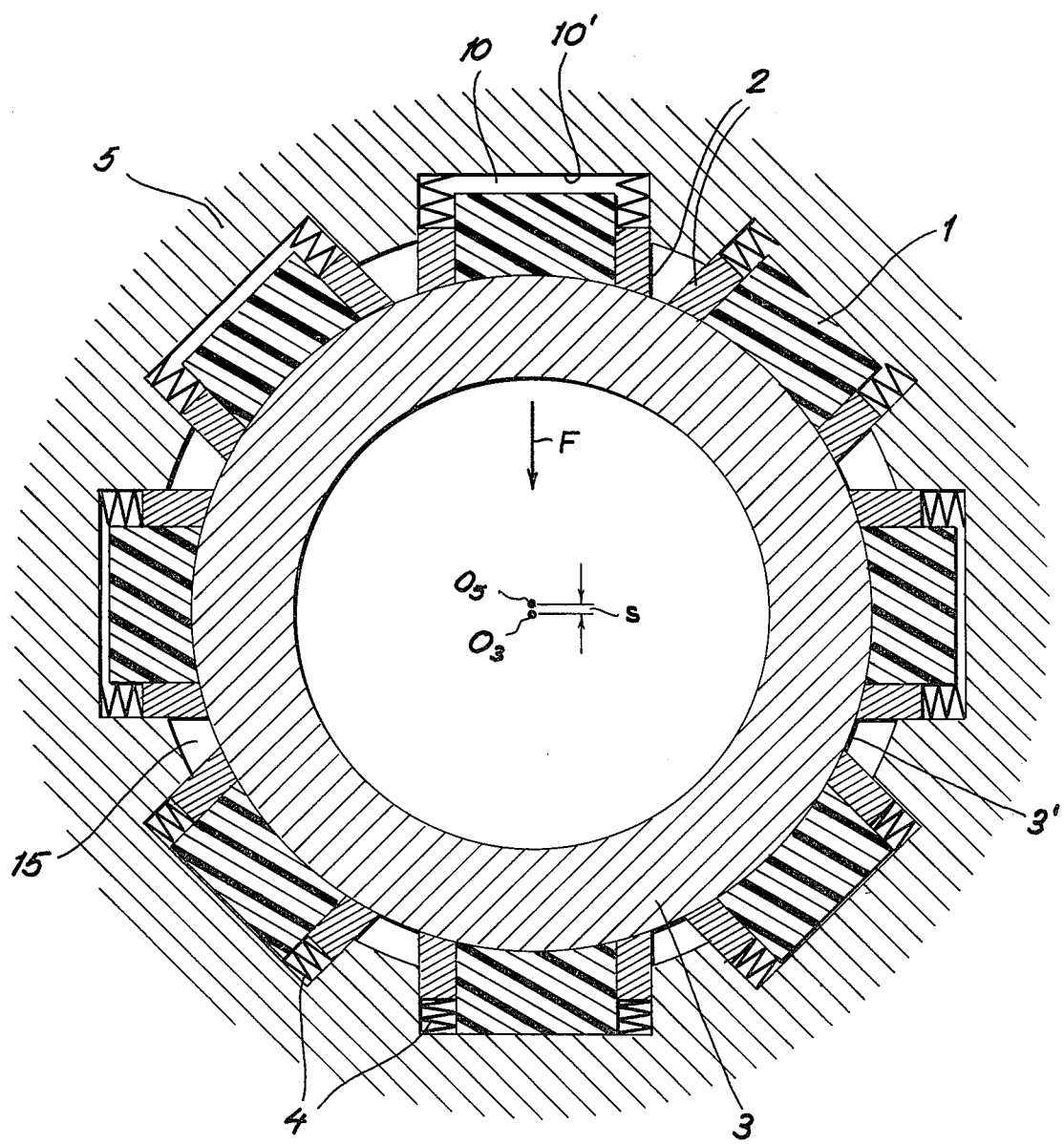
FIG. 1 is a cross-sectional view of a journal bearing embodying my invention, including a multiplicity of spacing units with sliding heads and retaining sleeves.

In FIG. 1 I have shown a journal bearing according to my invention, comprising a pair of coaxial and relatively rotatable support members, namely an inner bearing ring 3 and an outer bearing ring 5 separated from each other by an annular gap 15.

The outer bearing ring 5 is formed with a multiplicity of recesses 10, distributed in one or more rows over its inner peripheral surface, which are open to the gap 15 and receive respective sliding heads 1 embraced by individual metallic retaining sleeves 2. The heads 1 and the sleeves 2 project from their recesses 10, to an extent commensurate with the width of gap 15, which is subject to slight variations due to a small shift $s$ between the ring axes $O_3$ and $O_5$ caused by a loading force F; this eccentricity is compensated by the action of coil springs 4 which lie in cutouts 2' (FIG. 3) of sleeves 2 and exert a radially inward pressure upon these sleeves to bias them into contact with a confronting outer peripheral surface 3' of inner ring 3. It will be noted that the projecting faces of heads 1 and sleeves 2 are curved to conform to surface 3' which may be cylindrical but could also be spherically convex, as shown in FIG. 8. Especially in the latter instance, outer ring 5 may be split into two halves to facilitate assembly as described hereinafter with reference to FIGS. 7 and 8.

Prior to assembly, the sliding heads 1 may be gripped only lightly by their retaining sleeves 2 which could thus project beyond them as the heads 1 rest on the bottoms 10' of their recesses 10. After assembly, but in the absence of a load, the spring-biased sleeves 2 tend to hold the inner ring 3 centered in the outer ring 5, with their axes $O_3$ and $O_5$ coinciding. Under a downwardly acting force F, the sleeves 2 in the lower part of FIG. 1 are repressed against their springs 4 until the ring 3 comes to rest on the corresponding sliding heads 1 with disappearance of any clearance previously present between these heads and either the ring surface 3' or the recess bottom 10'. The resulting compression of the sliding heads also causes a slight plastic deformation thereof so that these heads henceforth remain flush with their sleeves 2 even in the absence of a compressive force, as shown in the upper part of FIG. 1. This assumes, of course, that there is some relative rotation between the outer ring 5 and the load direction F so that the several sliding heads 1 will all be under maximum pressure at various times. With the yieldability of springs 4 exceeding the elastic deformability of sliding heads 1, the major part of that pressure will be absorbed by these heads until the pressure reaches a value at which the sleeves abut the recess bottoms 10'.

Figure 2:
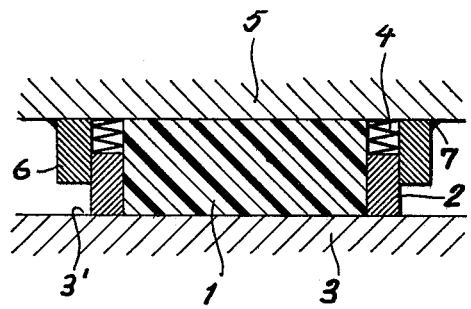
FIG. 2 is a cross-sectional view of a modified spacing unit for the bearing of FIG. 1.
Figure 3:
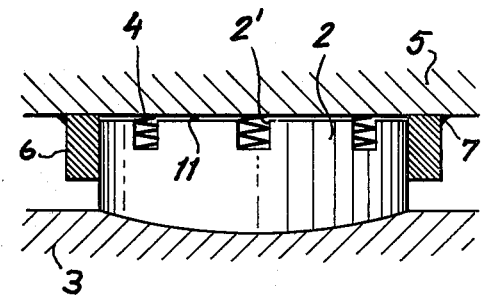
FIG. 3 shows the spacing unit of FIG. 2 with the retaining sleeve seen in elevation.

In FIGS. 2 and 3 I have shown an modified spacing unit comprising a sliding head 1, a retaining sleeve 2 and biasing springs 4 for use on a nonrecessed surface of ring 5. Each such assembly is positively guided, in radial direction, by a surrounding collar 6 welded at 7 to the ring 5. The sleeve 2 (whose construction is the same as in FIG. 1) has a crenellated edge formed with the aforementioned cutouts 2', open toward ring 5, which accommodate the coil springs 4. A residual clearance 11 present between ring 5 and sleeve 2 allows some elastic compression of head 1 before the sleeve abuts the ring 5.

Figure 4:
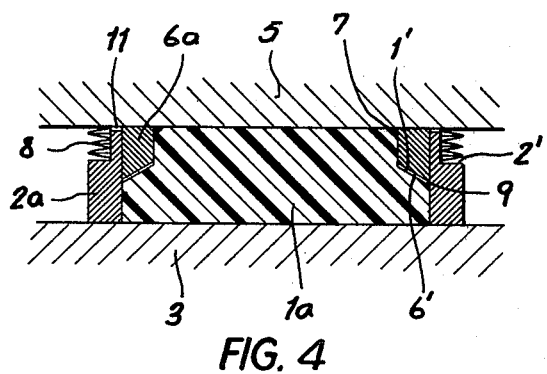
FIGS. 4 – 6 are cross-sectional views similar to FIG. 2, showing further modifications.

An alternative spacing unit is shown in FIG. 4 where a head 1a is rabbeted to form a beveled shoulder 1' converging toward a reduced neck in the vicinity of ring 5, thus leaving an annular clearance between itself and a surrounding sleeve 2a to accommodate a guide collar 6a. Sleeve 2a has a peripheral groove 2' receiving a stack of Belleville springs 8 which again urge the sleeve against a contact surface 3'. Collar 6a has a beveled face 6', diverging in the direction of contact surface 3', against which the correspondingly beveled shoulder 1' comes to rest upon elimination of an intervening space 9 together with the residual clearance 11 between sleeve 2a and ring 5; this helps center the head 1a on the collar 6a which is again welded at 7 to ring 5.

Figure 5:
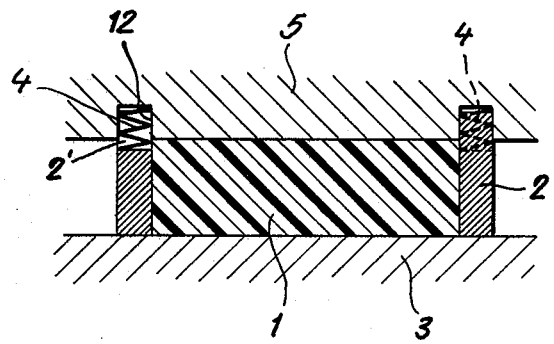

The modified spacing unit of FIG. 5 comprises a sliding head 1, a sleeve 2 with peripheral cutouts 2' and springs 4 received in these cutouts generally as shown in FIGS. 1 – 3, except that the ring 5 is here formed with a multiplicity of annular grooves 12 replacing the recesses 10 of FIG. 1. The crenellated edge formed by the cutouts 2' is received in the associated groove 12 in which, again, the sleeve 2 bottoms under maximum load to help support the inner ring 3. In this instance the radial height of the sleeve substantially exceeds that of the sliding head, in contrast to the arrangements of FIGS. 1 – 4 in which these heights are substantially the same.

Figure 6:
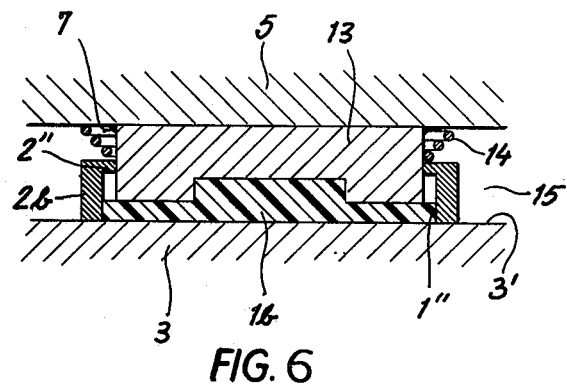

FIG. 6 shows a sliding head 1b whose height is only a fraction of the width of gap 15 and which is seated in a rigid, generally cup-shaped metallic holder 13. A retaining sleeve 2b has an internal peripheral flange 2" which slides along holder 13 and is overlain by a projecting rim 1" of head 1b. With holder 13 fixedly secured to ring 5 by a welding seam 7, rim 1" and flange 2" prevent any detachment of the sleeve prior to assembly. A frustoconical coil spring 14 surrounds the holder 13 and bears upon the sleeve 2b to bias it into contact with surface 3' of ring 3.

In this embodiment, in contrast to those previously described, the sleeve 2b has no portion offset from its biasing spring or springs to bottom on the ring 5 under maximum load. The reduced height of the elastic sliding head 1b, however, limits its compressibility especially in the region of rim 1" so that the space accommodating the spring 14 is not eliminated even under maximum load.

Figure 7:
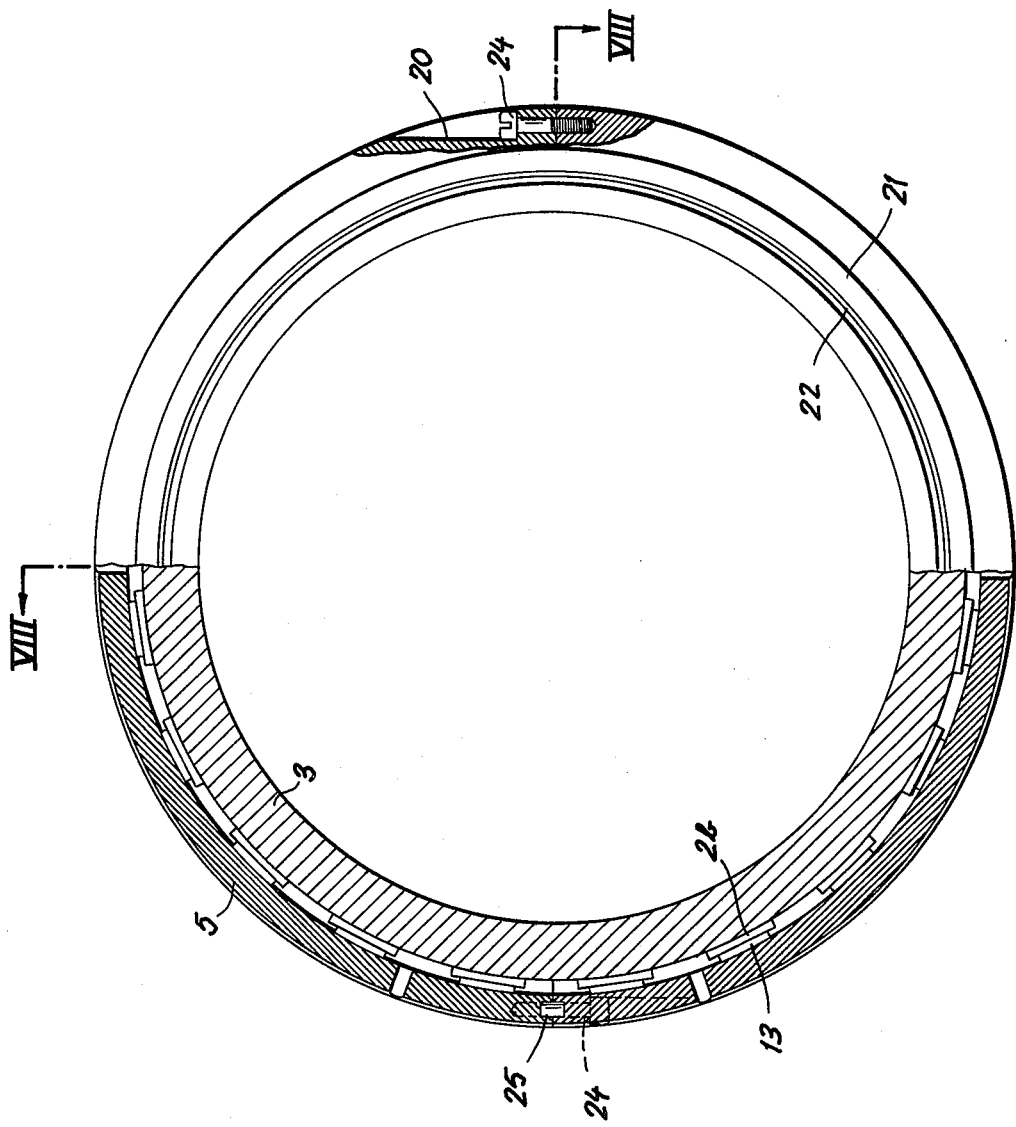
FIG. 7 is an axial view partly in section, similar to FIG. 1, of a journal bearing including spacing units of the type shown in FIG. 6.
Figure 8:
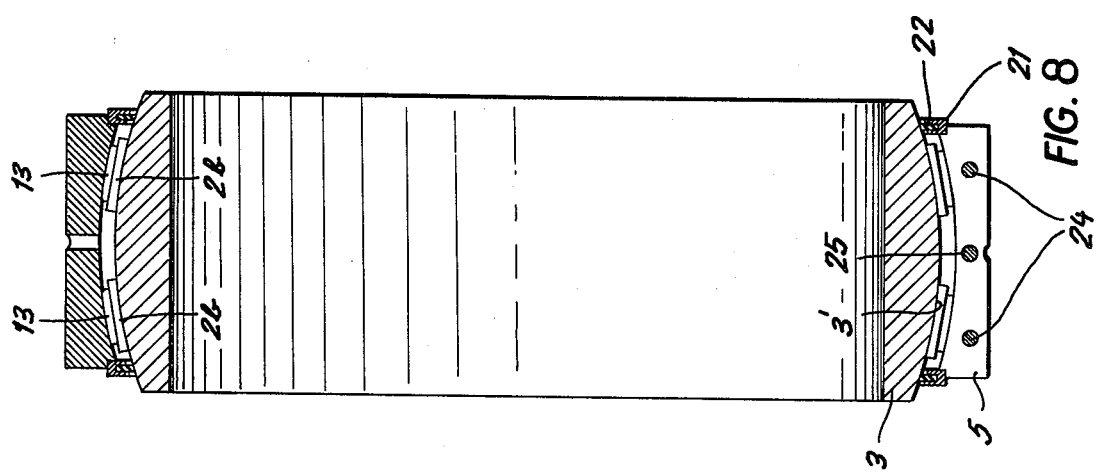
FIG. 8 is a sectional view taken on the line VIII—VIII of FIG. 7.

In FIGS. 7 and 8 I have shown a complete bearing incorporating two peripheral rows of spacing units 1b, 2b, 13 of the type shown in FIG. 6. The outer ring 5 is split into two halves held together, at diametrically opposite locations, by locator pins 25 and by fastening bolts 24 mounted in peripheral slots 20 of each half.

Ring 5 also carries a pair of annular channel members 21 which hold lip seals 22 of rubber or the like sweeping the inner ring 3.

Figure 9:
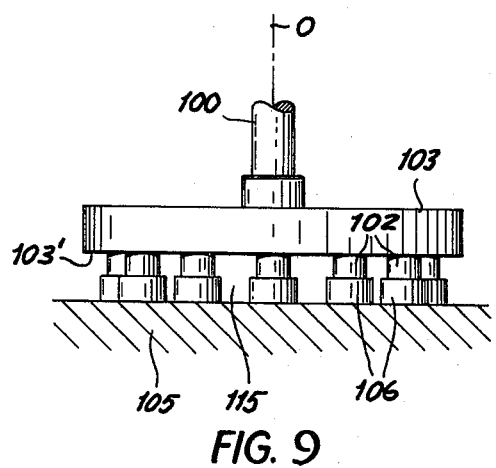
FIG. 9 is an elevational view of a journal bearing embodying my invention.

In FIG. 9, finally, I have illustrated a thrust bearing supporting a shaft 100 on a base 105, the shaft carrying a disk 103 which forms a contact surface 103' separated from that base by a gap 115 centered on the shaft axis 0. An array of sliding heads (not shown), surrounded by sleeves 102 and collars 106 generally as described with reference to FIGS. 1 – 3, holds the disk 103 separated from base 105, with the sleeves again biased by springs toward the contact surface 103'. Evidently, spacing units of the type shown in FIGS. 4, 5 or 6 could be substituted for those depicted in FIG. 9.

The contact surfaces engaged by the spacing units according to my invention may have a variety of curvatures, e.g. spherical, frustoconical or cylindrical. If one of the support members is a concrete base or shell, as for example in a converter mounting, fixed elements such as collars 6, 6a or holders 13 may be anchored in the concrete during casting.

Naturally, the arrangements shown in FIGS. 1 – 8 could be inverted with the spacing units mounted on the inner ring 3 for sliding contact with a confronting peripheral surface of outer ring 5.

I claim:
1. A bearing comprising:
   a first and a second support member mounted for relative rotation about an axis and separated by a gap centered on said axis;
   a multiplicity of sliding heads carried on said first support member and extending across said gap to a confronting surface of said second support member in low-friction contact therewith, said sliding heads consisting essentially of elastically deformable material at least in the vicinity of said confronting surface;
   a multiplicity of rigid retaining sleeves respectively embracing said sliding heads, said sleeves being positively guided on said first support member for displacement perpendicular to said confronting surface; and
   spring means on said first support member urging said sleeves into engagement with said confronting surface.
2. A bearing as defined in claim 1, further comprising a multiplicity of collars surrounding said sliding heads, said collars being fixedly secured to said first support member.
3. A bearing as defined in claim 2 wherein said sleeves are inserted between said collars and said sliding heads.
4. A bearing as defined in claim 2 wherein said sliding heads have reduced necks remote from said confronting surface, said collars surrounding said reduced necks and being in turn surrounded by said sleeves.
5. A bearing as defined in claim 4 wherein said sliding heads have beveled peripheral shoulders converging toward said necks, said collars having complementarily beveled annular faces adjoining said shoulders and diverging toward said confronting surface.
6. A bearing as defined in claim 1 wherein said first support member is provided with a multiplicity of recesses receiving at least said spring means and portions of said sleeves.
7. A bearing as defined in claim 1 wherein said sleeves have portions offset from said spring means for abutting against said first support member under a maximum loading force.

8. A bearing as defined in claim 1 wherein said first support member is provided with a multiplicity of dished holders fixedly secured thereto, said sliding heads being projectingly received in said holders.

9. A bearing as defined in claim 8 wherein said spring means and portions of said sleeves surround said holders.

10. A bearing as defined in claim 9 wherein said sliding heads have reduced rims projecting laterally beyond said holders, said portions of said sleeves having inner projections overlain by said rims.

* * * * *